June 30, 1970     L. ALPERT     3,518,613
MISSILE UMBILICAL CABLE
Filed March 27, 1968
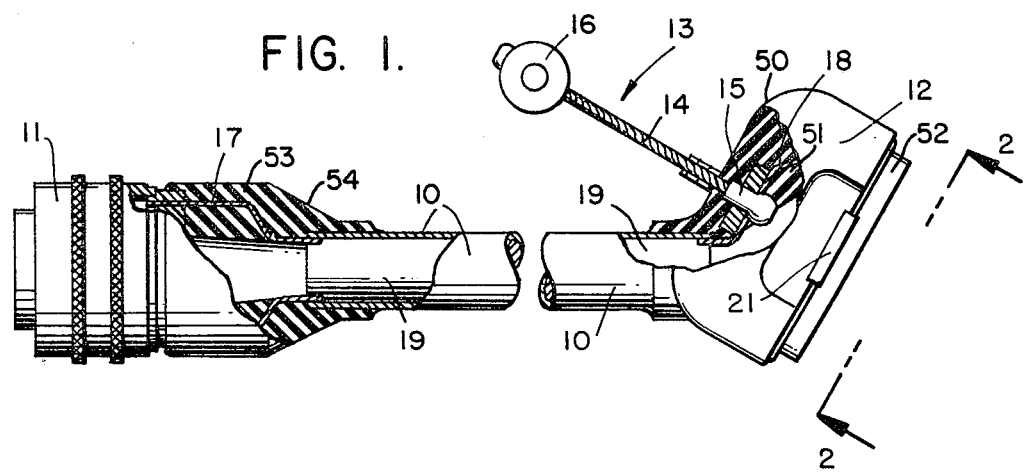
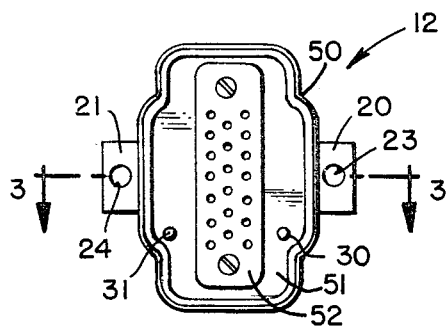
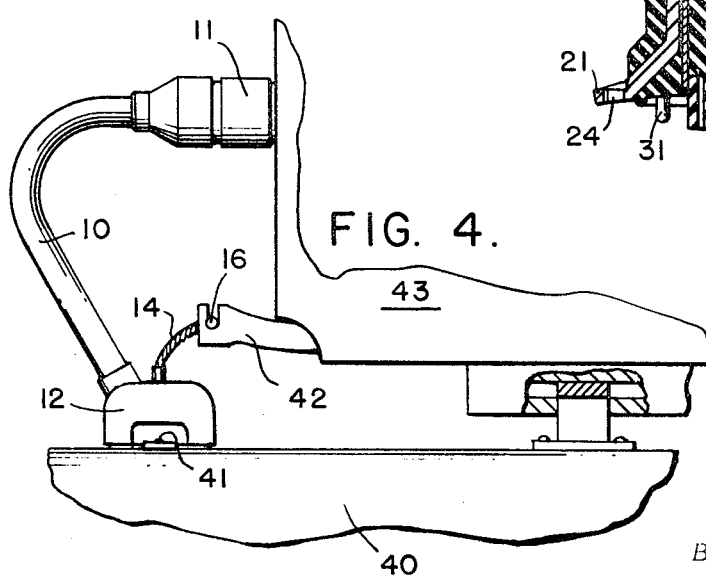
INVENTOR.
LOUIS ALPERT
BY ROY MILLER
ATTORNEY.

United States Patent Office 3,518,613
Patented June 30, 1970

3,518,613
MISSILE UMBILICAL CABLE
Louis Alpert, China Lake, Calif., assignor to the United States of America as represented by the Secretary of the Navy
Filed Mar. 27, 1968, Ser. No. 716,651
Int. Cl. H01r 13/62
U.S. Cl. 339—45          2 Claims

ABSTRACT OF THE DISCLOSURE

An umbilical adapted to interconnect a missile and launcher prior to launch and having a mechanical linkage interconnecting the missile and launcher to cause automatic disengagement of the umbilical from the missile upon launch in the absence of shearing forces and consequent destruction of the interconnecting pins or electrical components.

BACKGROUND OF THE INVENTION

It is conventional practice to electrically connect certain components of an aircraft carried missile with those of the aircraft so that certain information or the like may be communicated to the missile prior to the time it is launched and also that information may be communicated from the missile to the cockpit of the aircraft. Exemplary of these are displays, electrical circuits for presetting rocket guidance controls and arming the warhead or providing electrical energy for initiating operation of the missile motor and/or its electrical components. A flexible multi-conductor umbilical is generally employed for this purpose, which, upon launching of the missile, disconnects from the missile by somehow disengaging mating electrical connectors. Illustrative of some prior-art umbilicals are the patents to Marcon 3,072,021, Grimes 2,786,393, Samburoff et al. 3,111,355 and Boule et al. 3,193,790.

SUMMARY OF THE INVENTION

The invention basically comprises an umbilical adapted to interconnect a missile and launcher prior to launch of the missile. The umbilical incorporates a round flexible cable having electrical connectors at either end and a mechanical linkage at one end comprising a flexible steel cable terminating in a member. The umbilical interconnects in such a fashion that the end having the mechanical linkage is attached to the missile and the opposite end is attached to the launcher. Upon launch the T-shaped member is restrained in a slotted member fixedly secured to the launcher and the connector attached to the missile is separated from the missile without any destruction of the interconnecting pins or electrical components.

BRIEF DESCRIPTION OF THE DRAWINGS

FIG. 1 is a view of the complete umbilical and mechanical linkage;
FIG. 2 is a plan view of the electrical connector adapted for attachment to the missile;
FIG. 3 is a cross sectional view taken through the electrical connector of FIG. 2; and
FIG. 4 illustrates the manner in which the umbilical interconnects the missile and launcher prior to launch.

DESCRIPTION OF THE PREFERRED EMBODIMENT

FIG. 1 is a side elevation of the cable or umbilical used to interconnect the missile and launcher prior to launch. The umbilical comprises a flexible cable 10 having a circular cross section and terminating in an electrical connector 11 at one end adapted to be attached to the launcher and an electrical connector 12, generally rectangular in cross section, adapted to be connected to the missile. As shown, the connector 12 is generally rectangular in shape and has a minor axis passing through the center of screw holes 23, 24 in the ears 20 and 21, respectively and a major axis which passes through the center of the connector. Secured to the connector 12 is a mechanical linkage 13 incorporating a flexible steel cable 14 terminating at one end in an attaching member 15 which is securely fastened to the connector 12. The other end of the flexible cable 14 terminates in a T-shaped member 16 which is adapted to fit into a slotted member on the launcher.

Connectors 11 and 12 incorporate radiation shields 17 and 18, respectively and the interconnecting cable 10 also has a shield 19 surrounding it. Outer portion 50 and inner portion 51 of the connector 12 are formed of a potting material, a polyurethane compound in the present instance. The inner portion 51 terminates in a female connector receptacle 52, also formed of an insulator material. Connector 11 also has inner and outer portions 53 and 54 respectively formed of the potting material.

FIG. 2 is a view of the connector 12 illustrating ears 20 and 21 with holes therein which are adapted to receive screws which affix the connector 12 to the missile body prior to launch. Upon launch the screws shear off and allow the connector 12 to be removed from the missile as the missile moves away from the launcher.

FIG. 3 is a view taken in cross section through the connector 12 and mechanical linkage 13 illustrating the configuration of the linkage. The member 16 as illustrated is inserted into a slotted member on the launcher prior to launch. Also shown are guide pins 30 and 31 which position the connector 12 with respect to the receptacle on the missile body. A radiation shield 32 which terminates in the ears 20 and 21 is also shown as is the metal cap 18 shown in FIG. 1. Radiation shields 17, 18, 19 and 32 prevent the generation of stray electrical currents by radiation fields encountered in the operational environment.

The mechanical linkage is positioned with respect to connector 12 such that a line drawn through the center of the cable 14, member 16 and member 15 would pass through the intersection of the minor and major axes of the connector 12. This is done so that the pull on the connector 12 when the missile separates from the launcher acts as much as possible through the center of the connector to obviate any substantial shearing action on the connector pins.

FIG. 4 illustrates the manner in which the umbilical is positioned on a launcher 43 and missile prior to launch. As shown, the connector 12 is rigidly attached to the missile body 40 by means of screws of which one, 41, is shown. The member 16 is positioned in a slotted member 42 on the launcher 43. Connector 11 is securely affixed to the launcher and does not leave the launcher upon the missile being fired. Upon launch, the missile moves to the left in FIG. 4 whereupon screw 41 and its companion on the other side of the connector 12 shear off. The connector 12 is pulled upwardly and slightly rotated about a radius comprising the length of the flexible steel cable 14 and around the point at which the member 16 contacts the slotted member 42. In such a fashion, the connector 12 is separated from the missile body 40 substantially in the absence of any shearing force and the connector is not damaged nor are any pins on the missile portion sheared, bent or broken to the extent that the missile electronics are adversely affected. Thusly, the umbilical may be used for more than one launch.

The invention described herein may be manufactured and used by or for the Government of the United States of America for governmental purposes without the payment of any royalties thereon or therefor.

What is claimed is:
1. An umbilical cable adapted to interconnect a missile and a launching apparatus comprising;
   a flexible conductor carrying cable having ends;
   one end of said cable terminating in an electrical connector adapted to be connected to the launching apparatus;
   the other end of said cable terminating in another electrical connector;
   said another electrical connector being generally rectangular in cross section and having guide pins thereon adapted to align said another electrical connector with a mating connector on the missile;
   said another connector having a major and minor axis;
   a mechanical linkage having one end securely connected to the upper most portion of said another electrical connecter at a point corresponding to the intersection of the major and minor axes of said another electrical connector; said mechanical linkage terminating at an end remote from said another electrical connector in a member; said launcher means having slotted means attached thereto adapted to receive said member; so that when the missile separates from the launcher said another connector is pulled free of the missile substantially in the absence of shearing forces on said another connector.

2. An umbilical cable as set forth in claim 1 and further including;
   attachment means on either side of said another electrical connector in alignment with said minor axis.

References Cited
UNITED STATES PATENTS

| | | | |
|---|---|---|---|
| 967,681 | 8/1910 | Sloan | 339—10 |
| 2,432,120 | 12/1947 | Neill | 339—10 |
| 3,072,021 | 1/1963 | Marcon | 339—45 X |
| 3,111,355 | 11/1963 | Samburoff et al. | 339—45 X |
| 3,430,184 | 2/1969 | Acord | 339—45 |

RICHARD E. MOORE, Primary Examiner

P. A. CLIFFORD, Assistant Examiner

U.S. Cl. X.R.

89—1.811; 339—10